United States Patent [19]

Berner et al.

[11] 4,393,185

[45] Jul. 12, 1983

[54] THERMALLY POLYMERIZABLE MIXTURES AND PROCESSES FOR THE THERMALLY-INITIATED POLYMERIZATION OF CATIONICALLY POLYMERIZABLE COMPOUNDS

[75] Inventors: Godwin Berner, Rheinfelden; Rudolf Kirchmayr, Aesch, both of Switzerland

[73] Assignee: Ciba-Geigy Corporation, Ardsley, N.Y.

[21] Appl. No.: 380,801

[22] Filed: May 21, 1982

[30] Foreign Application Priority Data

Jun. 2, 1981 [CH]  Switzerland ........................ 3599/81

[51] Int. Cl.³ ............................................. C08G 77/04
[52] U.S. Cl. ...................................... 528/27; 528/88; 528/89; 528/92; 528/94; 528/119; 525/507
[58] Field of Search .................... 528/27, 88, 89, 92, 528/94, 119; 525/507

[56] References Cited

U.S. PATENT DOCUMENTS

| | | | |
|---|---|---|---|
| 3,236,784 | 2/1966 | Fischer et al. | 260/2 |
| 4,145,507 | 3/1979 | Wolfers et al. | 528/25 |
| 4,173,551 | 11/1979 | Crivello | 260/18 |
| 4,297,458 | 10/1981 | Stark | 528/27 X |
| 4,311,827 | 1/1982 | Noren | 528/27 X |

OTHER PUBLICATIONS

Abdul-Rasoul et al.–Polymer, vol. 19, Oct., 1978.

*Primary Examiner*—Lucille M. Phynes
*Attorney, Agent, or Firm*—Harry Falber

[57] ABSTRACT

Cationically polymerizable compounds, in particular epoxy compounds, can be polymerized by heating in the presence of a catalyst and a co-catalyst. The catalyst employed is a quaternary ammonium salt of an aromatic-heterocyclic compound which contains 1 or 2 N-atoms, and a complex halide anion, e.g. $PF_6^{\ominus}$. The co-catalyst employed is a diaryl ethane derivative; preferably benzpinacol, a silyl oligomer thereof, an organic per compound or a quinone.

5 Claims, No Drawings

THERMALLY POLYMERIZABLE MIXTURES AND PROCESSES FOR THE THERMALLY-INITIATED POLYMERIZATION OF CATIONICALLY POLYMERIZABLE COMPOUNDS

The invention relates to thermally polymerisable mixtures of cationically polymerisable compounds and a specific catalyst combination and also to the corresponding process for the thermally-initiated polymerisation of cationically polymerisable compounds.

Cationically polymerisable compounds, which do not contain an ethylenically unsaturated group, cannot be polymerised by simple heating. The addition of free radical initiators also has no effect. A thermal polymerisation of such monomers is only possible when using catalysts which form a cationic initiator at elevated temperature. One example of this is the thermally-initiated polymerisation of trioxan in the presence of aromatic diazonium salts, which is described in U.S. Pat. No. 3,236,784. These diazonium salts have the drawback of an inadequate storage stability at room temperature. Aromatic sulfonium or iodonium salts of complex halides which are known to be able to initiate cationic polymerisation on irradiation with UV light, act as cationic initiators only at relatively high temperatures without irradiation with UV light. The polymerisation temperature can be lowered to a technologically interesting range only by the addition of copper-II salts as co-catalysts, as described in U.S. Pat. No. 4,173,551. Technical shortcomings of this process are the blue-green colour of the copper salts, the inadequate solubility of these salts in many resins and their precursors or monomers, the autocatalytic effect of heavy metal salts in the light degradation of polymers, the impairment in the dielectric properties of resins which results from a content of conductive salts, and the inadequate storage stability of these mixtures.

In Polymer, 1978, 1219-22, F. Abdul-Rasoul, A. Ledwith and Y. Yagci recently showed that the cationic, thermally-initiated polymerisation of tetrahydrofuran with ditolyliodonium hexafluorophosphate as catalyst proceeds at an immeasurably slow rate at 70° C. However, if an agent which forms free radicals on heating is also added as the co-catalyst to this system, up to 17% conversion to the polymer takes place within 60 minutes. Azoisobutyronitrile, benzoyl peroxide, phenylazotriphenylmethane and benzpinacol are mentioned as suitable free radical co-catalysts. Similar effects result in the polymerisation of butyl vinyl ether with and without azoisobutyronitrile.

The polymerisation times required are too long and the yields are too low for this effect to be exploited rechnically. In addition, aromatic sulfonium and iodonium salts are difficult to obtain in pure form. Accordingly, there is still a need for a catalyst system for the thermal polymerisation of cationally polymerisable compounds.

It has been found that such compounds, especially epoxy compounds, can be thermally polymerised rapidly with high yield by using, as initiator, a mixture of a quaternary ammonium salt of an aromatic-heterocyclic nitrogen compound, which salt contains a complex halide anion as anion, and a thermal radical former.

Accordingly, the invention provides a thermally polymerisable mixture which comprises
(A) one or more cationically polymerisable compounds,
(B) a quaternary ammonium salt of an aromatic-heterocyclic compound which contains 1 or 2 N-atoms, and of a complex halide anion selected from the series consisting of $BF_4^\ominus$, $PF_6^\ominus$, $SbF_6^\ominus$, $SbF_5(OH)^\ominus$ or $AsF_6^\ominus$,
(C) a thermal radical former selected from one of the following classes
($C_1$) diaryl ethane derivatives of the formula I

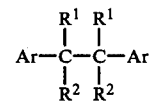

wherein Ar is phenyl, naphthyl, or phenyl which is substituted by $C_1$–$C_4$alkyl or chlorine, $R^1$ is OH, $C_1$–$C_4$alkoxy, —O—CO—$R^3$ or $OSi(R^4)(R^5)(R^6)$, wherein $R^3$ is $C_1$–$C_8$alkyl or phenyl, and each of $R^4$, $R^5$ and $R^6$ independently of the other is $C_1$–$C_{14}$alkyl or phenyl, and $R^2$ is $C_1$–$C_4$alkyl, cyclohexyl or Ar, ($C_2$) an oligomeric compound of the formula II

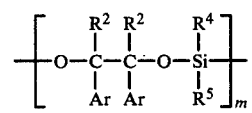

wherein m is 2 to 20,
($C_3$) an organic peroxide compound or
($C_4$) a quinone, and
(D) optionally further additives.

The invention also provides a process for the thermal polymerisation of cationally polymerisable compounds or mixtures of compounds by heating in the presence of a catalyst combination of the previously defined components (B) and (C).

Polymerisable compounds of this invention are O- or S-containing saturated heterocyclic compounds, in particular those having 3, 4 or 5 ring members, and their derivatives. Examples of such compounds are oxiranes such as ethylene oxide, propylene oxide, epichlorohydrin, styrene oxide, phenyl glycidyl ether or butyl glycidyl ether; oxetanes, such as trimethylene oxide, 3,3-dimethyloxetane or 3,3-di(chloromethyl)oxetane; oxolanes such as tetrahydrofuran or 2,3-dimethyltetrahydrofuran; cyclic acetals such as trioxan, 1,3-dioxolane or 1,3,6-trioxacyclooctane; cyclic lactones such as β-propiolactone, ε-caprolactone and the alkyl derivatives thereof; thiiranes such as ethylene sulfide, 1,2-propylene sulfide or thioepichlorohydrin; and thietanes such as 1,3-propylene sulfide or 3,3-dimethylthietane.

Further polymerisable compounds of this invention are those ethylenically unsaturated compounds which are polymerisable by a cationic mechanism. Such compounds include mono- and diolefins, for example isobutylene, 1-octene, butadiene and isoprene; styrene, allylbenzene or vinylcyclohexane; vinyl ethers such as vinyl methyl ether, vinyl isobutyl ether or ethylene glycol divinyl ether; vinyl esters such as vinyl acetate or vinyl stearate; N-vinyl compounds such as N-vinylpyrrolidone or N-vinylcarbazole, and dihydropyran derivatives, for example the 3,4-dihydro-2H-pyran-2-carboxylic acid esters of 2-hydroxymethyl-3,4-dihydro-2H-pyran.

Further polymerisable compounds of this invention are also the prepolymers of phenol-formaldehyde resins, urea-formaldehyde resins or melamine-formaldehyde resins, N-methylol derivatives of polycarboxylic acid amides, for example of polyacrylamide, and similar aminoplasts, and also mixtures of such aminoplasts with acrylic resins, alkyd resins or polyester resins containing functional groups.

Still further polymerisable compounds of this invention are mixtures of cationically polymerisable compounds and compounds polymerisable by free radicals, for example mixtures of epoxy resins with monomeric or oligomeric acrylic or methacrylic acid esters. In this case, the polymerisation takes place by a cationic mechanism and a free radical mechanism.

Compounds of particular importance amongst these polymerisable compounds cited above are the di- and polyepoxides and epoxide resin prepolymers which are used for the preparation of epoxy resins. This is usually accomplished by chemical curing with amines, phenols, dicarboxylic acid anhydrides and the like, either at room temperature or with heating. If the catalyst combination of this invention is used, the epoxides can be thermally cured, without the addition of chemical reactants, i.e. a one-component system can be employed.

The di- and polyepoxides used for this purpose may be aliphatic, cycloaliphatic or aromatic compounds. Examples of such compounds are the glycidyl ethers of aliphatic or cycloaliphatic diols or polyols, for example those of ethylene glycol, propane-1,2-diol, propane-1,3-diol, butane-1,4-diol, diethylene glycol, glycerol, trimethylolpropane or 1,4-dimethylol-cyclohexane or of 2,2-bis-(4-hydroxycyclohexyl)-propane, and the glycidyl ethers of di- and polyphenols, for example of resorcinol, 4,4'-dihydroxydiphenylmethane, 4,4'-dihydroxydiphenyl-2,2-propane or novolacs. Further examples are the N-glycidyl compounds, for example the diglycidyl compounds of ethyleneurea, 1,3-propyleneurea or 5-dimethylhydantoin or of 4,4'-methylene-5,5'-tetramethyldihydantoin, or such as triglycidyl isocyanurate.

Further glycidyl compounds of technical importance are the glycidyl esters of carboxylic acids, in particular of di- and polycarboxylic acids. Examples are the glycidyl esters of adipic acid, phthalic acid, tetra- or hexahydrophthalic acid, isophthalic acid or terephthalic acid or of trimellitic acid.

Examples of polyepoxides which are not glycidyl compounds are the diepoxides of vinylcyclohexene or dicyclopentadiene, glycidyl 3,4-epoxycyclohexanecarboxylate or 3',4'-epoxycyclohexylmethyl 3,4-epoxycyclohexanecarboxylate, butadiene diepoxide or isoprene diepoxide, epoxidised linoleic acid derivatives or epoxidised polybutadiene.

Furthermore, it is also possible to use ethylenically unsaturated epoxy compounds which are able to react polyfunctionally under the conditions of the invention and thus are capable of forming crosslinked resins. Examples of such compounds are allyl glycidyl ether, acrylic acid glycidyl ether or methacrylic acid glycidyl ether or unsaturated polyepoxides such as partially acrylated or methacrylated epoxy resins.

Preferred epoxides which may be used according to the invention are the di- and polyglycidyl ethers of di- and polyphenols.

The di- and polyepoxides may be used in mixtures with one another or with monoepoxides or in mixtures with hydroxy compounds, for example in order to modify the physical properties of the resins obtainable therefrom. The di- and polyepoxides can also be pre-cured by chemical means, for example by reaction with diols, amines or dicarboxylic acid anhydrides. The use of such prepolymers for the production of articles from epoxy resins can have certain advantages over the use of the di- and polyepoxides, for example more simple storage and handling, more rapid processing to shaped articles and also the possibility of the incorporation of additives, such as glass fibres or pigments, into the propolymers, for example during the preparation of prepregs.

Such prepolymers may also be prepared by chemical means, as the ammonium salt of component (B) decompose on UV irradiation to form Lewis acids which act as initiators of the cationic polymerisation. Such an irradiation may also be carried out in the presence of photosensitisers. Finally, the prepolymers may also be prepared by the process of this invention. In this case, therefore, the di- or polyepoxide is first precured in a low temperature range and the prepolymer obtained is cured in a higher temperature range.

The quaternary ammonium salts employed as component (B) are salts of aromatic-heterocyclic nitrogen bases with complex halide anions. Examples of aromatic-heterocyclic nitrogen bases are, in particular, 6-membered nitrogen-containing heterocyclic compounds such as pyridine, pyrimidine, pyridazine and pyrazine, and the alkyl or aryl derivatives thereof, benzo and naphtho derivatives, e.g. picoline, lutidine, quinoline, isoquinoline, quinoxaline, phthalazine, quinazoline, acridine, phenanthridine or phenanthroline.

Particularly preferred ammonium salts suitable for use as component (B) are ammonium salts of the formulae III, IV and V

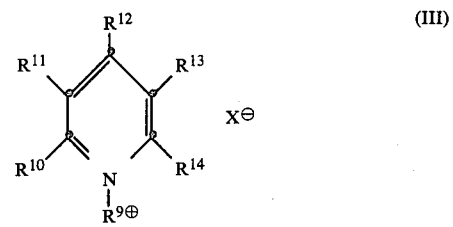

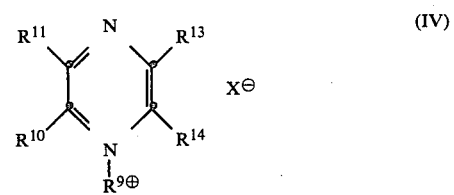

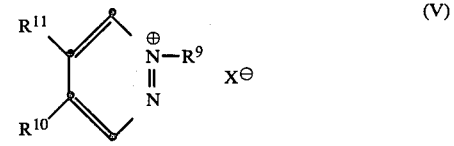

wherein $R^9$ is $C_1$–$C_{12}$ alkyl, $C_3$–$C_{15}$ alkoxyalkyl or benzoylmethyl, each of $R^{10}$, $R^{11}$, $R^{13}$ and $R^{14}$ independently of the other is hydrogen, $C_1$–$C_4$alkyl or phenyl, or $R^{10}$ and $R^{11}$ or $R^{11}$ and $R^{12}$ or $R^{12}$ and $R^{13}$ or $R^{13}$ and $R^{14}$, together with the two carbon atoms to which are they are attached, are a fused benzo, naphtho, pyridino or quinolino radical, and X is $BF_4$, $PF_6$, $SbF_6$, $SbF_5(OH)$ or $AsF_6$.

Some of these ammonium salts are e.g. known compounds, and some are novel compounds which may be prepared by methods analogous to known ones. In particular, they may be prepared by quaternisation of the heterocyclic bases with the halogen compounds $R^9$-Hal and subsequent replacement of the halogen anion by X by means of the alkali salts of X.

Individual examples of compounds of the formulae III, IV and V are: 1-methylquinolinium hexafluorophosphate, 1-methylquinolinium hexafluoroantimonate, 1-methylquinolinium hexafluoroarsenate, 1-methylquinolinium pentafluorohydroxyantimonate, 1-methylquinolinium tetrafluoroborate, 1,2-dimethylquinolinium hexafluorophosphate, 1-ethylquinolinium hexafluorophosphate, 1-butylquinolinium hexafluorophosphate, 1-benzoylmethylquinolinium hexafluorophosphate, 1-benzoylmethylquinolinium hexafluoroantimonate, 1-methyl-2,3-diphenylpyridinium hexafluorophosphate, 1,2-dimethyl-3-phenylpyridinium hexafluorophosphate, 1-benzoylmethylpyridinium hexafluorophosphate, 1-ethoxyethylquinolinium hexafluorophosphate, 2-methylisoquinolinium hexafluorophosphate, 10-methylacridinium hexafluorophosphate, 10-benzoylmethylacridinium hexafluorophosphate, 10-butylacridinium hexafluoroarsenate, 5-methylphenanthridinium hexafluorophosphate, 5-benzoylmethylphenanthridinium hexafluorophosphate, 1-methylnaphthyridinium hexafluorophosphate, 1-methyl-2,3-diphenylquinoxalinium hexafluorophosphate, 1,2,3-trimethylquinoxalinium hexafluorophosphate, 1-methylquinazolinium hexafluorophosphate, 1-methylquinolinium hexafluorophosphate, 1,2,4,6-tetramethylpyrimidinium hexafluorophosphate, 1-methyl-2,4-diphenylpyrimidinium hexafluorophosphate, 1-methyl-3-phenylpyridazinium hexafluorophosphate, 1-methyl-2,5-diphenylpyridazinium hexafluorophosphate, 1-methylphenanthrolinium hexafluorophosphate, 5-butylphenazinium hexafluorophosphate, 1-methylquinoxalinium hexafluorophosphate, 1-benzoylmethylquinoxalinium hexafluorophosphate.

Diaryl ethane derivatives of the formula I may be used as co-catalyst of component (C). These compounds are pinacols and their ethers, esters or silyl derivatives. The pinacols themselves are particularly preferred, for example benzpinacol or acetophenone pinacol.

These compounds are known compounds which may be prepared by methods which are known per se. The pinacols are preferably obtained by reduction of ketones. The derivatives may be obtained from these pinacols by etherification, esterification or silylation.

Examples of compounds of the formula I which may be employed in this invention as radical formers are: benzpinacol, benzpinacol dimethyl ether, benzpinacol diethyl ether, benzpinacol diisopropyl ether, benzpinacol diacetate, benzpinacol dipropionate, benzpinacol dibutyrate, benzpinacol dicaprylate or benzpinacol dibenzoate, 1,2-di-(trimethylsiloxy)-tetraphenylethane, acetophenone pinacol dimethyl ether, acetophenone pinacol dipropyl ether, acetophenone pinacol diacetate, acetophenone pinacol divalerate or acetophenone pinacol dibenzoate, propiophenone pinacol dimethyl ether, propiophenone pinacol dibutyl ether, propriophenone pinacol diacetate, 2,3-diphenyl-2,3-bis-(triphenylsiloxy)-butane or 3,4-diphenyl-3,4-bis-(trimethylsiloxy)-hexane.

The compounds of the formula II are oligomeric silyl ethers of pinacols having a molecular weight of about 500-5000. They may be prepared in accordance with German Offenlegungsschrift No. 2 632 294 from the corresponding aryl ketone by reaction with dialkyl or diaryl chlorosilanes in the presence of metals such as Mg, Li, Na or K. Examples of compounds of the formula II are the reaction products of benzophenone, propiophenone or acetophenone with dichlorodimethylsilane or dichlorodiphenylsilane in the presence of magnesium. Preferred compounds of the formula II are those in which $R^8$ is phenyl and $R^4$ and $R^5$ are methyl.

An organic peroxide compound may also be used as co-catalyst of component (C). Such a compound may be a diorganoperoxide or monoorganohydroperoxide. The organic radical can in particular be an alkyl, cycloalkyl, arylkyl, alkanoyl or aroyl radical. These compounds are known compounds and many of them are employed commercially as thermal radical formers. Specific examples of such compounds are: dibenzoyl peroxide, dilauryl peroxide, dicumyl peroxide, di-tert-butyl peroxide, cumyl hydroperoxide, tert-butyl hydroperoxide, cumyl tert-butyl peroxide, tert-butyl perbenzoate, cyclohexanone peroxide, methyl ethyl ketone hydroperoxide, acetylacetone peroxide, tert-butyl peroctoate, bis-2-ethylhexyl peroxide dicarbonate or tert-butyl peracetate.

Finally, a quinone may also be used as co-catalyst of component (C), for example benzoquinone, naphthoquinone, tetrachlorobenzophenone, 2,3-dichloronaphthoquinone, anthraquinone or tetrachloroanthraquinone. The preferred quinone is 2,3-dichloro-5,6-dicyanobenzoquinone.

The compounds employed as component (C) are compounds which are stable at room temperature and decompose into radicals on heating. If this is effected in the presence of ammonium salts (B), there result initiators for cationic polymerisation reactions, the precise structure of which initiators is not reliably known. The compounds employed as components (B) and (C) are not able by themselves to initiate cationic polymerisation reactions-not even at elevated temperature. The use of the mixture of the invention of aromatic-heterocyclic ammonium salts with a thermal radical former makes it possible, however, for cationically polymerisable compounds to undergo complete polymerisation by simple heating over a short period of time.

To carry out the polymerisation in practice, the monomer or monomer mixture is mixed with the necessary amount of the two catalysts. These mixtures are stable at room temperature and can be handled without hazard. In general, it is not necessary to add any additional activating component prior to initiation of polymerisation, so that the mixtures are therefore one-component systems which can be cured at any time. The polymerisation itself is effected by heating the mixture to elevated temperature. In general, temperatures of 60°-200° C. and in particular of 100°-160° C. are necessary for this purpose, depending on the material used and the polymerisation time desired. The shorter the desired polymerisation time, the higher the polymerisation temperature must be. Usually, polymerisation will be carried out with simultaneous shaping, for example in hot presses or in moulds which can be supplied with a source of heat. Heating may be effected e.g. in an oven, by infrared radiation or microwave radiation.

As already mentioned above, the thermally-initiated polymerisation can also be combined with a photopolymerisation. In this case, the monomer is either first subjected to irradiation with short-wave light and then heated or first heated and then irradiated. Conventional UV lamps are suitable for the irradiation, and the effect of the irradiation can be further increased by the addition of catalytic amounts of a photosensitiser. Suitable photosensitisers are e.g. organic dyes, fused aromatic hydrocarbons, for example perylene, anthracene or thioxanthone and the derivatives thereof which are known in general as sensitisers for photochemical processes. The advantage of such additional UV radiation is that, by this means, the time for heat-curing can be shortened or the curing temperature can be lowered.

The required amount of the two catalysts depends on the nature of the material to be polymerised and on the desired polymerisation conditions. In general, 0.1 to 10% by weight, preferably 0.1 to 5% by weight, of each of the two catalysts is used, based on the weight of the compound to be polymerised. It is preferred to use 1 to 5% by weight, preferably 1 to 2% by weight, of the ammonium salt, and 1 to 2% by weight of the thermal radical former.

In addition to containing the polymerisable compounds and the catalysts, the mixture may also contain still further additives which are customarily employed in plastics and resin technology. Examples of such additives are extender resins, fillers, pigments, dyes, glass fibres or other fibres, stabilisers such as antioxidants or light stabilisers, flame retardants, antistats, blowing agents, levelling agents, or heat stabilizers to prevent premature gelation, e.g. weak bases such as nitriles, lactams or urea derivatives.

These additives may be blended with the polymerisable compounds simultaneously with the catalysts, or also independently of these latter, either beforehand or subsequently. Depending on their consistency, the mixtures of the invention are solids or liquids or highly viscous liquids. For use as paints, a spreadable or sprayable consistency will be preferred. For use as a casting or laminating resin, a castable consistency will be preferred. For use as a moulding composition, a solid consistency will be preferred.

The use of the cured compositions of the invention is the same as that of the compositions cured by conventional means. Examples are surface protection, adhesives, electrical insulating compositions and the production of laminates and mouldings or of foamed articles. The choice of polymerisable compound depends on the intended use. In certain cases mixtures of cationically curable compounds will be used in order to achieve specific properties in the cured resin. These can be mixtures of compounds of the same chemical type, for example two different polyepoxides or one polyepoxide and a monoepoxide, or mixtures of compounds of different types, for example a mixture of a polyepoxide and tetrahydrofuran or caprolactone or a mixture of a monoepoxide and a dicarboxylic acid anhydride.

Further details may be gathered from the following Examples, in which parts and percentages are by weight.

EXAMPLE 1

5 g of a highly viscous epoxy resin which is based on bisphenol-A glycidyl ether and has an epoxy equivalent of 182–194 g/equivalent, and 0.1 g of each of the catalysts and co-catalysts indicated in Table 1 are put into a test tube and homogenised by stirring with gently warming (about 40° C.). While stirring continuously with a glass rod, the test tube is warmed to 160° C.±2° C. in an oil bath until the glass rod can no longer be moved because of the gelling which has taken place. This time is designated as the gel time. The following table indicates the effect of different catalysts and co-catalysts by themselves or in a mixture of the invention.

TABLE 1

| Catalyst (component B) | Co-catalyst (component C) | Gel time at 160° C. |
|---|---|---|
| 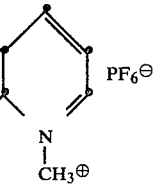 | — <br> C 1 | >20 min. <br> 115 sec. |
| 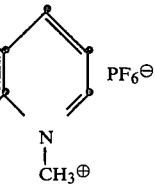 | — <br> C 1 | >20 min. <br> 300 sec. |
| 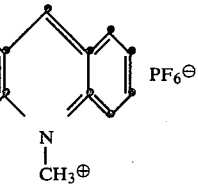 | — <br> C 1 <br> C 2 | >20 min. <br> 145 sec. <br> 110 sec. |
| 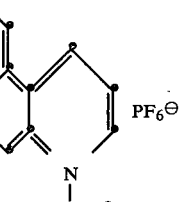 | — <br> C 1 | >20 min. <br> 240 sec. |
| 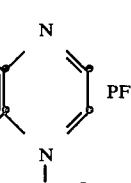 | — <br> C 3 <br> C 4 | >20 min. <br> 190 sec. <br> 290 sec. |
| 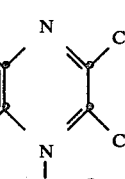 | — <br> C 1 | >20 min. <br> 240 sec. |

TABLE 1-continued

| Catalyst (component B) | Co-catalyst (component C) | Gel time at 160° C. |
|---|---|---|
| 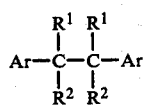 | — <br> C 1 | >20 min. <br> 190 sec. |

Co-catalysts employed:
C 1 = benzpinacol

C 2 = oligomer of the formula 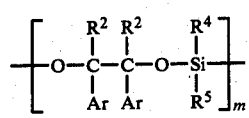 and
prepared in accordance with Example 3 of German Offenlegungsschrift 2 632 294 from benzophenone and dimethyldichlorosilane.
C 3 = 2,3-dichloro-5,6-dicyanobenzoquinone
C 4 = dibenzoyl peroxide

What is claimed is:

1. A thermally polymerisable mixture which comprises
   (A) one or more cationally polymerisable compounds,
   (B) a quaternary ammonium salt of an aromatic-heterocyclic compound which contains 1 or 2 N-atoms, and of a complex halide anion selected from the series consisting of $BF_4^\ominus$, $PF_6^\ominus$, $SbF_6^\ominus$, $SbF_5(OH)^\ominus$ or $AsF_6^\ominus$,
   (C) a thermal radical former selected from one of the following classes
   (C₁) diaryl ethane derivatives of the formula I $$Ar-\underset{\underset{R^2}{|}}{\overset{\overset{R^1}{|}}{C}}-\underset{\underset{R^2}{|}}{\overset{\overset{R^1}{|}}{C}}-Ar \qquad (I)$$

wherein Ar is phenyl, naphthyl or phenyl which is substituted by $C_1$-$C_4$alkyl or chlorine, $R^1$ is OH, $C_1$-$C_4$alkoxy, —O—CO—$R^3$ or —O—Si($R^4$)($R^5$)($R^6$), wherein $R^3$ is $C_1$-$C_8$alkyl or phenyl, and each of $R^4$, $R^5$ and $R^6$ independently of the other is $C_1$-$C_4$alkyl or phenyl, and $R^2$ is $C_1$-$C_4$alkyl, cyclohexyl or Ar,
   (C₂) an oligomeric compound of the Formula II $$\left[ -O-\underset{\underset{Ar}{|}}{\overset{\overset{R^2}{|}}{C}}-\underset{\underset{Ar}{|}}{\overset{\overset{R^2}{|}}{C}}-O-\underset{\underset{R^5}{|}}{\overset{\overset{R^4}{|}}{Si}}- \right]_m \qquad (II)$$

wherein m is 2 to 20,
   (C₃) an organic peroxide compound or
   (C₄) a quinone, and
   (D) optionally further additives.

2. A mixture according to claim 1, which contains, as component (B), a compound of the formula III, IV or V

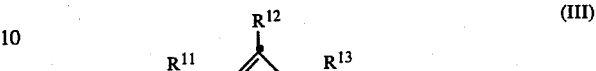

wherein $R^9$ is $C_1$-$C_{12}$alkyl, $C_3$-$C_{15}$alkoxyalkyl or benzoylmethyl, each of $R^{10}$, $R^{11}$, $R^{13}$ and $R^{14}$ independently of the other is hydrogen, $C_1$-$C_4$alkyl or phenyl, or $R^{10}$ and $R^{11}$ or $R^{11}$ or $R^{12}$ or $R^{12}$ and $R^{13}$ or $R^{13}$ and $R^{14}$, together with the two carbon atoms to which they are attached, are a fused benzo, naphtho, pyridino or quinolino radical, and X is $BF_4$, $PF_6$, $SbF_5(OH)$ or $AsF_6$.

3. A mixture according to claim 1 which contains, as compoment (A), one or more epoxy compounds.

4. A mixture according to claim 1, which contains, as component (C), an organic peroxide compound of the formula R—O—O—R', wherein R is alkyl, cycloalkyl, aralkyl, alkanoyl or aroyl, and R' is hydrogen, alkyl, cycloalkyl, aralkyl, alkanoyl or aroyl.

5. A process for the thermal polymerisation of cationically polymerisable compounds or mixtures of compounds by heating in the presence of a catalyst and a co-catalyst, which process comprises using as catalyst a quaternary ammonium salt of an aromatic-heterocyclic compound which contains 1 or 2 N-atoms, and a complex halide anion selected from the group consisting of $BF_4^\ominus$, $PF_6^\ominus$, $SbF_6^\ominus$, $SbF_5(OH)^\ominus$ or $AsF_6^\ominus$, and, as co-catalyst, a thermal radical former according to component (C) of claim 1.

* * * * *